(12) United States Patent
Zhang

(10) Patent No.: US 7,072,658 B2
(45) Date of Patent: Jul. 4, 2006

(54) VERSATILE WIRELESS NETWORK SYSTEM

(76) Inventor: Franklin Zhigang Zhang, 4808 Laurette St., Torrance, CA (US) 90503

( * ) Notice: Subject to any disclaimer, the term of this patent is extended or adjusted under 35 U.S.C. 154(b) by 345 days.

(21) Appl. No.: 10/269,815

(22) Filed: Oct. 12, 2002

(65) Prior Publication Data
US 2004/0198338 A1    Oct. 7, 2004

(51) Int. Cl.
*H04Q 7/20*    (2006.01)
(52) U.S. Cl. ............................ 455/445; 455/560
(58) Field of Classification Search ............ 455/422.1, 455/445, 63.1, 67, 452.1, 450, 423, 425, 455/561, 3.03, 446, 456.5, 560; 370/328, 370/218, 351–356
See application file for complete search history.

(56) References Cited
U.S. PATENT DOCUMENTS
6,347,091 B1 *    2/2002    Wallentin et al. ........... 370/437
6,466,556 B1 *    10/2002    Boudreaux .................. 370/331
6,553,219 B1 *    4/2003    Vilander et al. ............ 455/411
6,574,473 B1 *    6/2003    Rinne et al. ................ 455/436
6,754,193 B1 *    6/2004    Luz et al. ................... 370/331
6,822,947 B1 *    11/2004    Sawyer et al. .............. 370/328
6,898,433 B1 *    5/2005    Rajaniemi et al. ....... 455/456.1
2004/0033806 A1 *    2/2004    Daniel et al. ............... 455/450
2004/0203397 A1 *    10/2004    Yoon et al. ................ 455/63.1

* cited by examiner

Primary Examiner—CongVan Tran

(57) ABSTRACT

The Service Transmit Equipment (STE) in the invention has one wireless networking interface communicating to a plurality of Client Utility Equipments (CUE) forming a cell network. The STE is the node router of the cell network. The cell network connects to other networks via the STE. A plurality of cell networks connect together to a core network forms a service wireless network system. The CUE is the edge network traffic control equipment; each connects to a plurality of clients with different service agreement predefined. The CUE controls the transition of the network packets from or to its clients. Only useful network packets from clients can be allowed into the service network. The system maintains a high efficiency of internal bandwidth utilization, and can service clients with a versatile networking performance.

3 Claims, 6 Drawing Sheets

VERSATILE WIRELESS NETWORK SYSTEM

BACKGROUND

1. Field of the Invention

The present invention relates to a service wireless network system, which accommodates a highly efficient and versatile networking performance.

2. Description of the Prior Art

Network usage is becoming increasingly popular at a rapid rate. A data networking system, which is formed by a group of computers and other computerized equipments, allows data communication among a plurality of clients that each client is usually a single computer, or a subnet. The major function of a LAN (local area network) networking system is to make the communication among the devices within the network. When applying the LAN networking system to more complicate application, like a service network, the function of communication is just a basic requirement, more networking features is needed to meet the service requirements. Among them, different client devices or subnets need to have different connection speed. Maintaining the stability of the network is also very important when the network scale is getting larger and the networking traffic is getting bigger.

A service networking system of the prior art usually comprises central service equipments and customer premises equipments. Ethernet and ATM are the most popular protocols implemented at the lower level of the networking. IP network is the most popular data connectivity delivery system. Cable, DSL and similar types of the service network all base on IP protocol at networking layer three. A typical data service network is a centralized network, which delivers the service from a central service equipment to a plurality of remote clients, many clients sharing the same service node. Implemented with bridging mode among clients, the network is easy to be setup and supposedly easy to be managed. But, due to the nature of bridging protocol, a large amount of redundant network packets flows in the media, wasting a big portion of the media bandwidth.

In order to service different types of clients, a centralized service network usually adopts a special device or feature to control bandwidth or to maintain the QOS for clients. Because it is a centralized system, the bandwidth control equipment needs to handle the traffic of the whole network. So, the system load is getting heavier as the client number increases, and the equipment itself adds bigger and bigger latency to the whole communication system. Due to the nature of centralized control architecture, the abundant network packets get dropped till it reaches the central bandwidth control device. In another word, a network packet travels through many devices/equipments and may get dropped at the central node. This prior art of service control is very inefficient, wasting network bandwidth, and having less accurate results. In conclusion, the centralized type of network is very inefficient and has poor service stability. It's very hard to maintain and manage the Quality Of Service (QOS) for clients, and to meet the actual requirement of high standard data networking.

SUMMARY INCLUDING OBJECTS AND ADVANTAGES

The present invention of the service wireless network system comprises a plurality of service cell networks. A service cell network comprises one STE (Service Transmit Equipment) and a plurality of CUEs (Client Utility Equipment). One STE acts as a central service node of the service network cell for a plurality of CUEs. One CUE works as a gateway device of a plurality of clients. The CUE has network routing capability and networking bandwidth control capability. The cell network may be connected to an outside networking device to allow this cell network become part of bigger network.

When a network packet incoming to a cell node STE for its clients, the STE routes the packet to the correct CUE according to the destination address of the packet. When the CUE receives the incoming network packet from the STE, it routes and delivers the packet to the correct client according to the service agreement of that client. When a network packet incoming to the CUE from its clients, the CUE routes and delivers the packet to the right destination according the service agreement of the transmitting client. When the network packet is received by the STE from its CUE, the STE routes the packet to the right destination of the packet without unnecessary delay.

OBJECTS AND ADVANTAGES

Accordingly, several objects and advantages of my invention are:

1) To provide a wireless networking system that is capable of delivering versatile combination of the networking qualities. More specifically, to provide different service agreement to a plurality of subnets;

2) To provide a highly efficient wireless networking system. More specifically, to provide a wireless network without any un-necessary packet flow that causes waste of networking bandwidth;

3) To provide a single solution for delivering versatile data networking. One system is capable of delivering different types of service among a plurality of connections;

4) To improve the processing power of the whole network system by distributing the networking work load from node devices to a plurality of edge devices;

5) To improve service network system that can maintain the same service grade while the number of the client increases.

Still further objects and advantages can become apparent from a consideration of the ensuing description and accompanying drawings.

PREFERRED EMBODIMENT—DESCRIPTION

Figure 1:
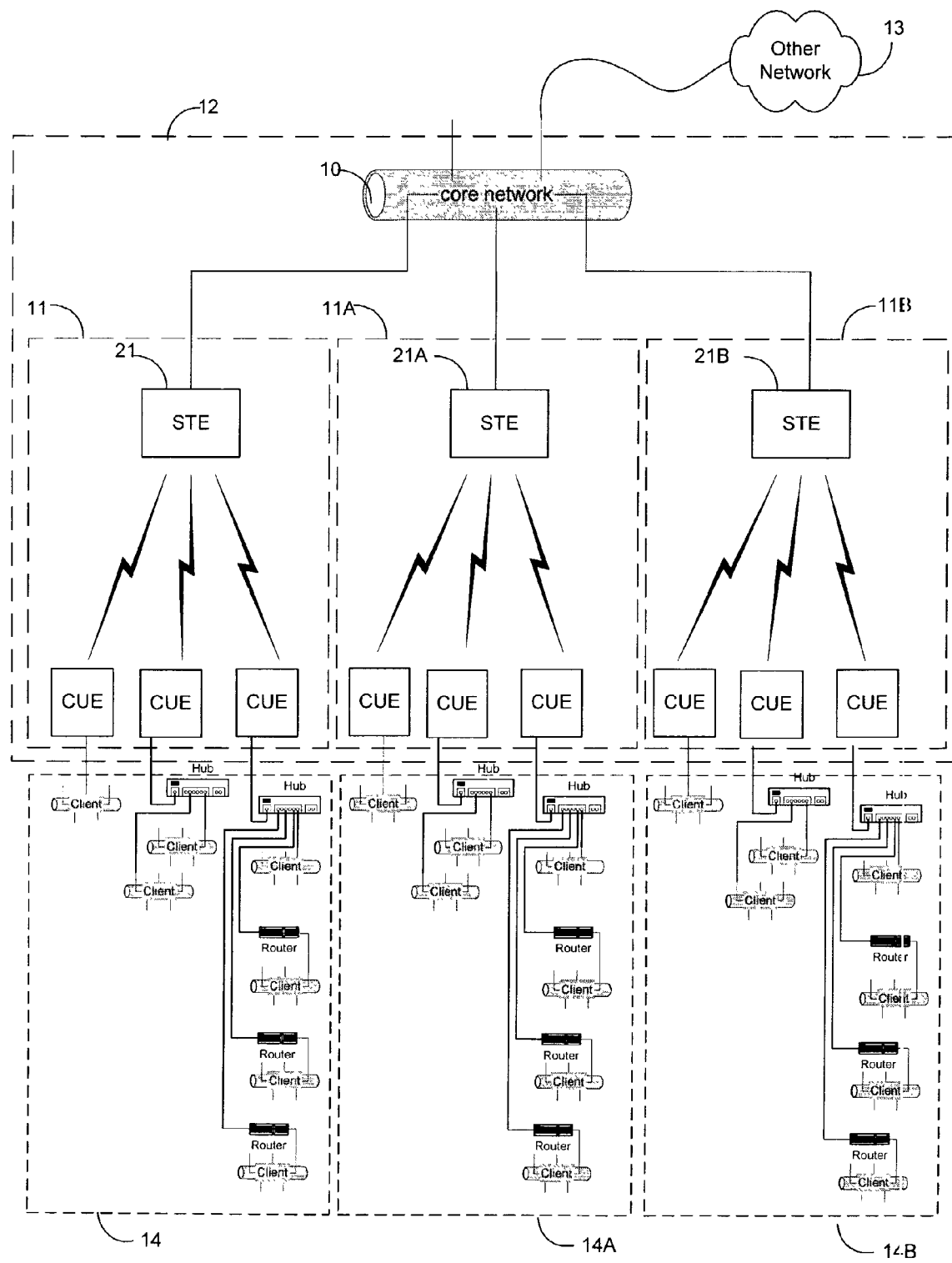
FIG. 1 is a schematic block representation of a Versatile Wireless Network System of the present invention.

FIG. 1 is a schematic block representation of a Versatile Wireless Network System of the present invention. As shown, a plurality of cell networks11, 11A, 11B connected to a core network10 form the Versatile Wireless Network System12. The Versatile Wireless Network System12 can be connected to outside network13 via the core network10, and, become a part of a bigger network. The Versatile Wireless Network System12 delivers different networking services to its clients with different Quality Of Service.

Figure 2:
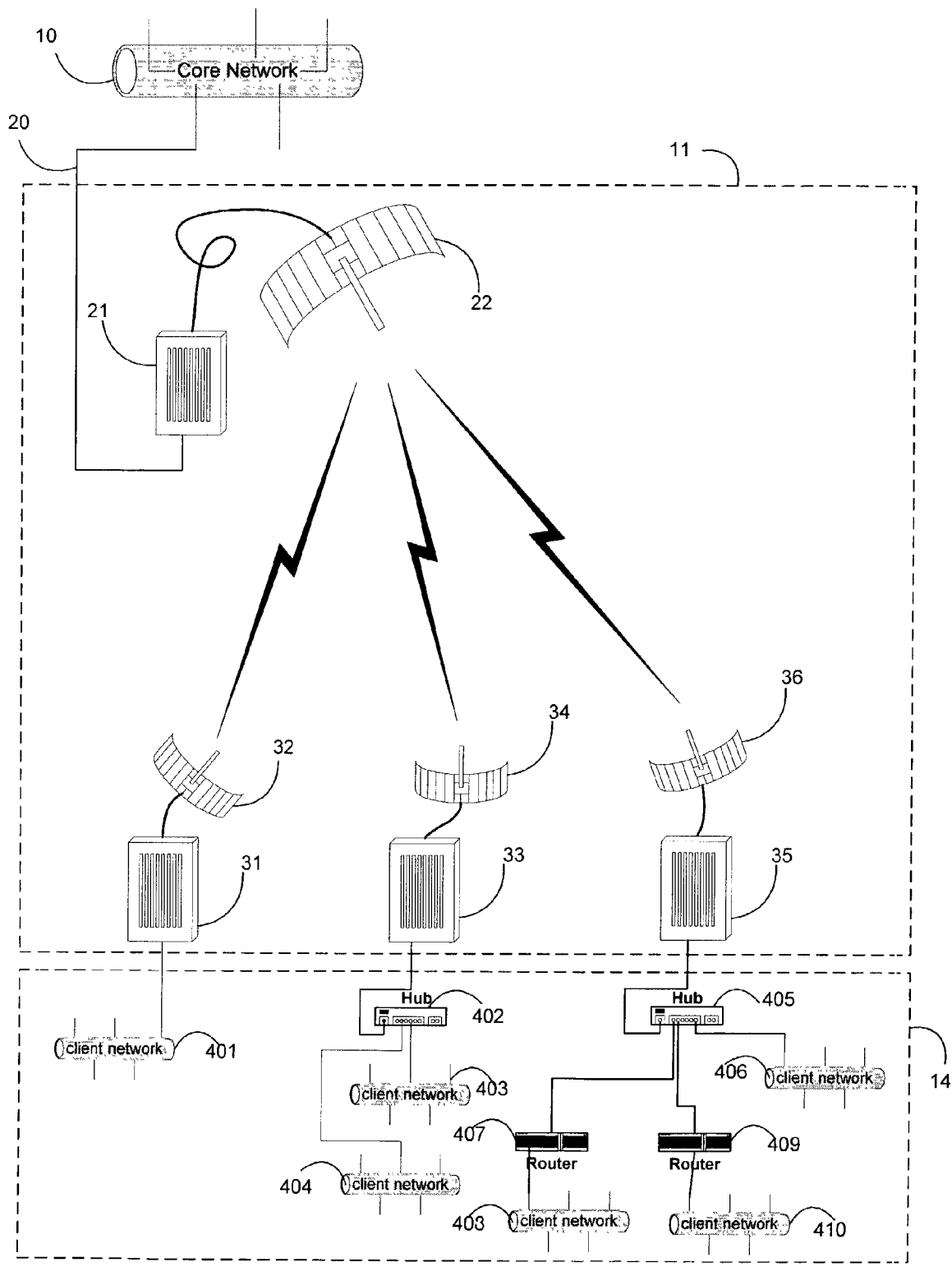
FIG. 2 is a schematic block representation of one cell network comprises one Service Transmit Equipment (STE) and a plurality of Client Utility Equipments (CUEs) interconnection with client group that comprises a plurality of subnets of the present invention.

FIG. 2 is a schematic block representation a cell network11 comprises one Service Transmit Equipment (STE) 21, a plurality of Client Utility Equipments (CUEs) 31,33, 35, and, interconnected with the client group14 that comprises a plurality of subnets401,403,404,406,408,410 of the present invention. In this embodiment, the STE21 is connected to the main network10. Any networking packets coming from and going to the outside network of the cell network11 is via the connection20 between the STE21 and the core network10. The STE21 also communicates with the remote CUEs(31,33,35) via the antenna22 to the antennae32, 34, 36. The CUEs31,33,35 are the edge devices between the STE21 in the cell network11 and client group 14. The CUE number can be any within the communication limit of the STE21.

The CUE 31 has a single client sub network401. The CUE31 is working as a gateway router for the client network401. Only the necessary network traffic from/to the client network401 can be accepted by the CUE31. The CUE31 also works as an edge traffic bandwidth control unit in the cell network11 for its client subnet401.

As shown, the CUE33 is connected to two simple single subnets403, 404 through the hub 402. The CUE33 is working as a gateway router for the client networks403, 404. Only the necessary network traffic from/to the client networks 403, 404 can be accepted by the CUE33. The CUE33 also works as an edge traffic bandwidth control unit in the cell network11 for its subnets403, 404.

Further as shown, the CUE35 is connected to one simple single subnet406 through the hub405 and two routed subnets408, 410 through routers407, and 409. The CUE35 is working as a gateway router for the client networks406, 408,410. Only the necessary network traffic from/to the client networks 406, 408,410 can be accepted by the CUE35. The CUE35 also works as an edge traffic bandwidth control unit in the cell network11 for its subnets406, 408, 410.

There is no traffic bandwidth control feature at the central node STE 21, the link between the STE21 and the CUEs 31, 33, 35 is working at full bandwidth capacity upon the limit of the equipment. Therefore, the CUE has the full resource to guarantee the QOS to its clients upon the full link bandwidth. The Client number of each CUE can be different.

Figure 3:
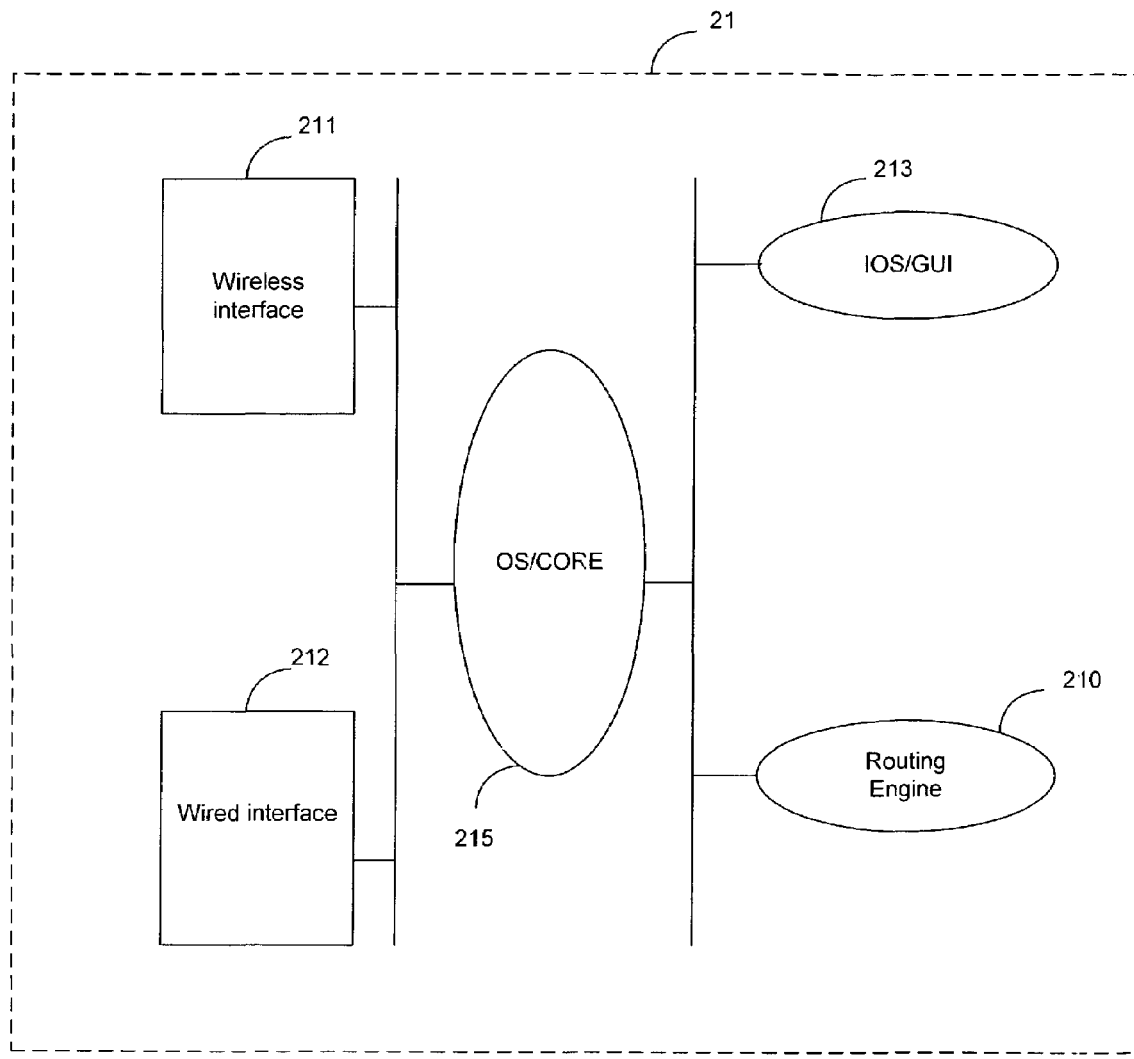
FIG. 3 is a schematic block representation of the STE of the present invention.

FIG. 3 is a schematic block representation of the STE of the present invention. As shown, the OS/CORE215 is the core of a computer system comprises hardware and operating software. The OS/CORE215 communicates with outside network via a wired interface 212 and a wireless interface 211. The Routing Engine210 is the software functionality that handles all the networking packets transition. The IOS/GUI213 is the software mechanism that interfaces with the system operator to configure and control the whole system operation.

Figure 4:
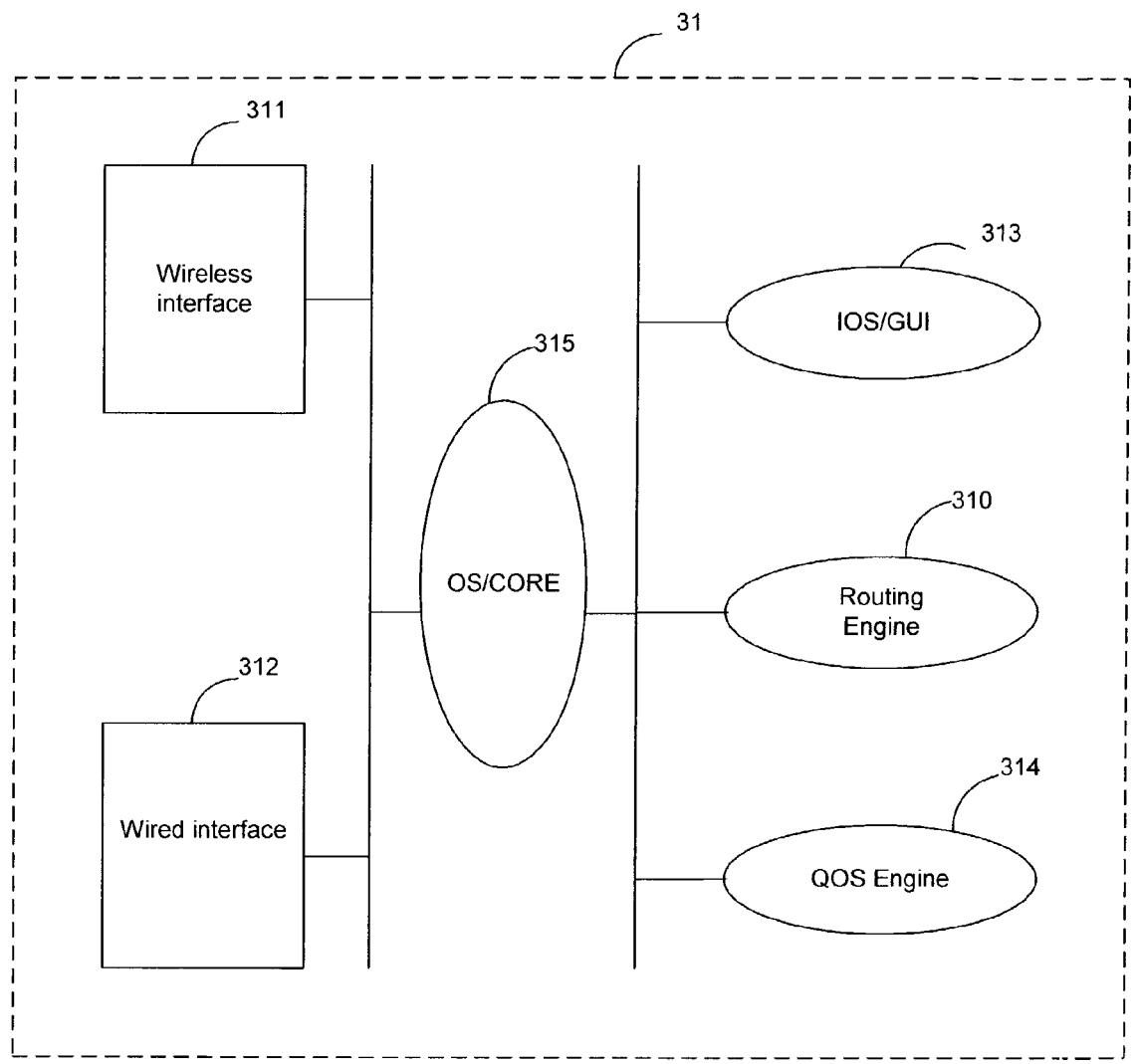
FIG. 4 is a schematic block representation of the CUE of the present invention.

FIG. 4 is a schematic block representation of the CUE of the present invention. As shown, the OS/CORE315 is the core of a computer system comprises hardware and operating software. The OS/CORE315 communicates with outside network via a wired interface312 and a wireless interface311. The Routing Engine 310 is the software functionality that handles all the networking packets transition. The QOS Engine314 is responsible for the usage delivery rate of bandwidth control of the packet flow from/to a specific subnet or IP. The IOS/GUI313 is the software mechanism that interfaces with the system operator to configure and control the whole system operation.

Preferred Embodiment—Operation

Figure 5:
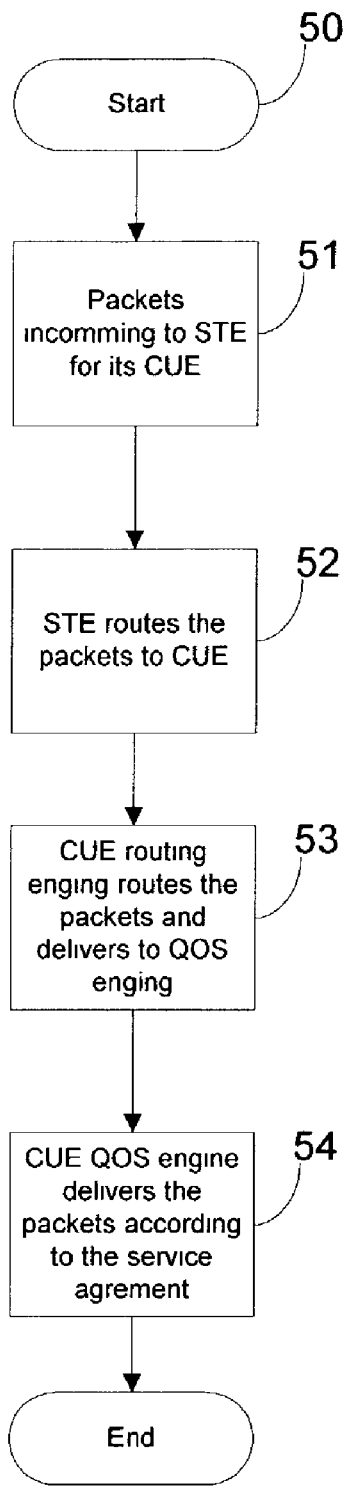
FIG. 5 is a flow chart representation of a network packet from outside network transmitted through the STE, CUE to one of the client networks.

FIG. 5 (start from 50) is a flow chart representation of a network packet from outside network transmitted to the STE, CUE, and then to one of the client subnets. When there is a networking packet incoming to the STE from outside network (51), the STE routes the packet to the right CUE according to the destination of the packet (52). The CUE receives the packet from the STE. The routing engine of the CUE routes the packet and forwards the packet to its QOS engine (53). The QOS engine of the CUE delivers the packet to the client according to the receiving packet control bandwidth agreement predefined for the client (54).

Figure 6:
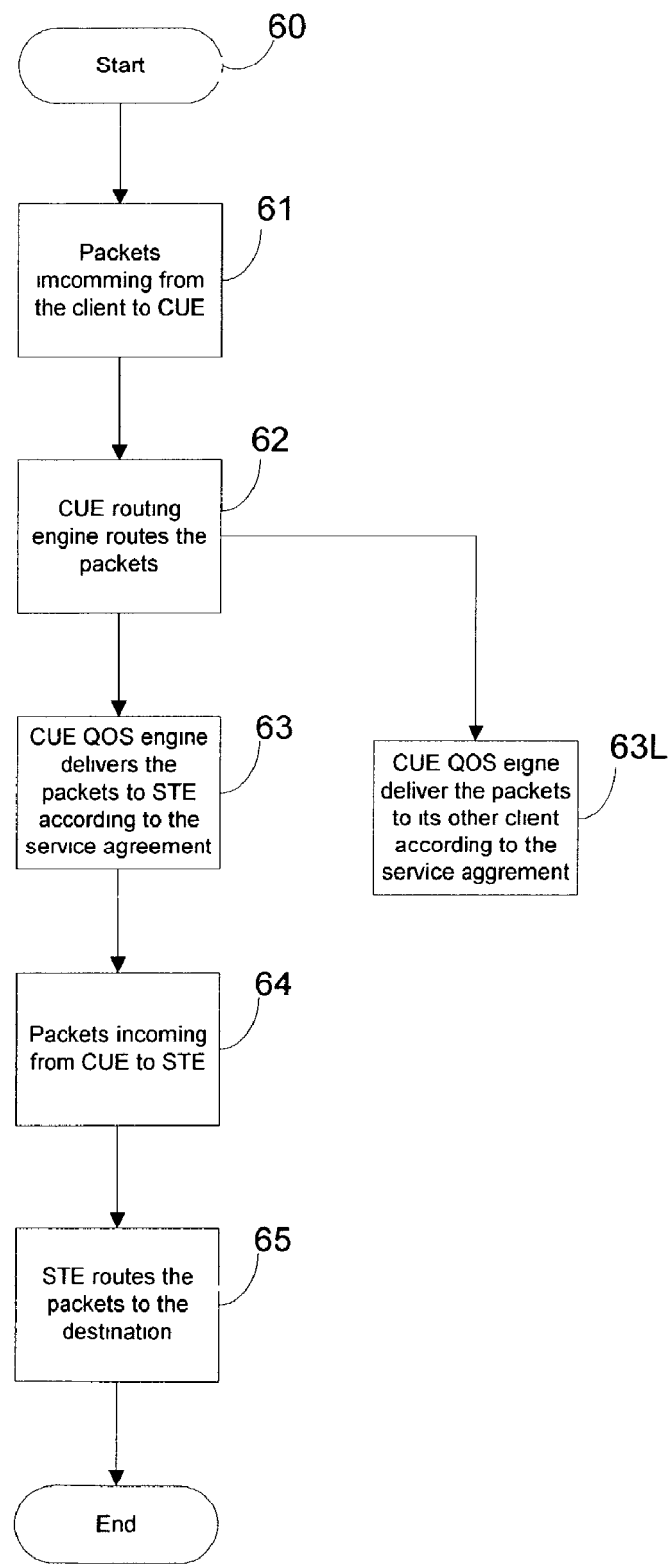
FIG. 6 is a flow chart representation of a network packet from one of the client networks transmitted through the CUE, STE to outside network.

FIG. 6 (start from 60) is a flow chart representation of a network packet from one of the client network transmitted to the CUE, STE, and then to outside network. AS shown, when a client transmits a packet to the cell network, the packet is transmitted to the CUE (61). The CUE receives the packet. The routing engine of the CUE routes the networking packet according to the destination, and then forwards it to QOS engine (62). The QOS engine delivers the packet to the STE (or its other client) according to the transmitting packet control bandwidth agreement predefined for the client (63,63L). The STE receives the packet from the CUE (64). The STE routes and transmits the packet to its destination (65).

CONCLUSIONS, RAMIFICATIONS, AND SCOPE

It can be seen that in the invention the high efficiency wireless networking system can provide versatile QOS to a plurality of direct or routed client networks. A STE functions as a node router communication with a plurality of CUEs. A CUE functions as a special gateway device for its subnets. One STE and a plurality of CUEs linked together forms a cell network. More importantly, all the redundant network packets are kept out from the main network by the edge device CUE, thus greatly improves the system efficiency. Further, the current network system is capable to aggregate the processing power of all the networking devices, and become a bigger and much more powerful network system. Still further, the system performance is more stable when the client network number increases, because of each CUE as an edge traffic control device taking care of the service to it's own client networks. The system scale can be increased by adding more cell networks, and meanwhile the network efficiency remains the same.

Although the description above contains much specificity, these should not be construed as limiting the scope of the invention but as merely providing illustrations of some of the presently preferred embodiments of this invention. Various other embodiments and ramifications are possible within it's scope. For example, this system may apply to a wired network, when replacing the STE with a regular router, and replacing wireless port of the CUE with a wired networking port. One other variation is: replacing the wired connection port of the STE with a wireless connectivity port.

Thus the scope of the invention should be determined by the appended claims and their legal equivalents, rather than by the examples given.

What is claimed is:

1. A wireless networking system for providing connections to a plurality of client networks with different service levels comprising a plurality of Service Transmit Units (STE) and a plurality of Client Utility Units (CUE);

Whereby, one said STE communicating with a plurality of said CUEs via wireless communication links forming a cell network; and Wherein, said STE is the network node device for said CUEs of the same said cell network; and Whereby, said CUE can be connecting to a plurality of client networks; and Wherein, said CUE is the gateway device of client networks; and Wherein, said CUE controls the connection service levels of it client networks; and Whereby, a plurality of said STEs are connecting to a common main network; and Whereby, a plurality of said cell networks connecting to a main network via their own said STE's networking interface forming the said wireless networking system.

2. The STE of claim 1 has routing capability to route networking packet between the main network and the said CUEs of claim 1 in the same cell network of claim 1;

Whereby, a networking packet enters said STE from the main network side is routed by the said STE and transmitted to the corresponding target CUE in the same cell network of claim 1;

Whereby, a networking packet enters the said STE from the communicating CUE of the same said cell network is routed and transmitted to target through the main network.

3. The CUE of claim 1 has routing capability and network bandwidth control capabilities, said CUE is the gateway device of its client networks, said CUE controls the network bandwidth between the said CUE and said client networks, said routing capability of the said CUE routes the networking packet among the said STE of claim 1 and client networks of claim 1;

Whereby, a network packet enters said CUE from the uplink STE is routed towards the target said client network and deliver to target said client network according to bandwidth control setting;

Whereby, a networking packet enters said CUE is forwarded towards its uplink said STE and delivered to said STE according to the bandwidth control setting.

* * * * *